(12) United States Patent
Tamamura et al.

(10) Patent No.: US 12,095,323 B2
(45) Date of Patent: Sep. 17, 2024

(54) MOTOR, AND COIL USED FOR SAME (71) Applicant: Panasonic Intellectual Property Management Co., Ltd., Osaka (JP)

(72) Inventors: Toshiyuki Tamamura, Osaka (JP); Kiyomi Kawamura, Osaka (JP); Keiichiro Nukada, Osaka (JP)

(73) Assignee: PANASONIC INTELLECTUAL PROPERTY MANAGEMENT CO., LTD., Kadoma (JP)

( * ) Notice: Subject to any disclaimer, the term of this patent is extended or adjusted under 35 U.S.C. 154(b) by 889 days.

(21) Appl. No.: 17/056,268

(22) PCT Filed: Aug. 30, 2019

(86) PCT No.: PCT/JP2019/034234
§ 371 (c)(1),
(2) Date: Nov. 17, 2020

(87) PCT Pub. No.: WO2020/054467
PCT Pub. Date: Mar. 19, 2020

(65) Prior Publication Data
US 2021/0249924 A1 Aug. 12, 2021

(30) Foreign Application Priority Data

Sep. 14, 2018 (JP) .................. 2018-172738

(51) Int. Cl.
*H02K 3/18* (2006.01)
*H02K 1/14* (2006.01)
(Continued)

(52) U.S. Cl.
CPC ............ *H02K 3/18* (2013.01); *H02K 1/146* (2013.01); *H02K 1/276* (2013.01); *H02K 21/16* (2013.01)

(58) Field of Classification Search
CPC .. H02K 3/12; H02K 3/18; H02K 3/48; H02K 3/50; H02K 3/52; H02K 3/521; H02K 3/522; H02K 2203/06
See application file for complete search history.

(56) References Cited

U.S. PATENT DOCUMENTS

| 5,973,434 A | 10/1999 | Soh et al. |
| 2002/0057031 A1 | 5/2002 | Ueda et al. |

(Continued)

FOREIGN PATENT DOCUMENTS

| CN | 1471218 A | 1/2004 |
| CN | 105703511 A | 6/2016 |

(Continued)

OTHER PUBLICATIONS

Machine translation of JP-2009118636-A (Year: 2009).*
(Continued)

*Primary Examiner* — Daniel C Puentes
*Assistant Examiner* — Minki Chang
(74) *Attorney, Agent, or Firm* — WHDA, LLP (57) ABSTRACT

A motor includes a stator and a rotor at a predetermined distance from the stator. The stator includes an annular yoke, a plurality of teeth connected to the inner circumference of the yoke, and a plurality of coils each wound around an associated one of the teeth. Each coil has coil ends at both ends in an axial direction. At least one of the coil ends has, in an end surface thereof in the axial direction, a first recess extending along the radius of the stator. The first recess houses a first wiring member connecting the coils together.

7 Claims, 8 Drawing Sheets (51) Int. Cl.
*H02K 1/276* (2022.01)
*H02K 21/16* (2006.01)

(56) References Cited

U.S. PATENT DOCUMENTS

| | | |
|---|---|---|
| 2003/0230953 A1 | 12/2003 | Koike et al. |
| 2010/0194214 A1 | 8/2010 | Takahashi et al. |
| 2017/0353063 A1 | 12/2017 | Bell et al. |

FOREIGN PATENT DOCUMENTS

| | | | | |
|---|---|---|---|---|
| DE | 10 2012 212 637 A1 | | 1/2014 | |
| JP | 11-98749 A | | 4/1999 | |
| JP | 2004-135466 A | | 4/2004 | |
| JP | 2009118636 A | * | 5/2009 | |
| WO | WO-2020017143 A1 | * | 1/2020 | ............... H01F 5/00 |
| WO | WO-2021131575 A1 | * | 7/2021 | ............. H02K 1/148 |

OTHER PUBLICATIONS

Machine translation of WO-2021131575-A1 (Year: 2021).*
Machine translation of WO-2020017143-A1 (Year: 2020).*
Extended (Supplementary)European Search Report dated Jan. 25, 2022, issued in counterpart EP Application No. 19859415.2. (7 pages).
The Extended European Search Report dated Mar. 25, 2022, issued in counterpart EP Application No. 21210028.3. (8 pages).
International Search Report dated Nov. 19, 2019, issued in counterpart International Application No. PCT/JP2019/034234. (1 page).

* cited by examiner

MOTOR, AND COIL USED FOR SAME

TECHNICAL FIELD

The present invention relates to a motor and coils used for the motor.

BACKGROUND ART

In recent years, there is an increasing demand for motors for industrial and in-vehicle applications. Under the circumstances, downsizing of motors and an increase in the efficiency of motors are desired.

As a technique of improving the efficiency of a motor while reducing the volume of the motor, an increase in the space factor of coils disposed in slots of a stator is known. The increase in the space factor of the coils reduces losses caused by a current flowing through the coils when driving the motor.

Placement of cast coils made of a copper material in slots has been suggested (see e.g., Patent Document 1) as a technique of increasing the space factor of the coils. In this configuration, the coils have a quadrangular cross section and a large diameter to increase the space factor.

CITATION LIST

Patent Documents

[Patent Document 1] German Patent Application Publication No. 102012212637

SUMMARY OF THE INVENTION

Technical Problem

In order to establish electrical connection among a plurality of coils arranged in a motor, each coil typically has a wiring member such as a wire or a bus bar under or over an end in an axial direction, specifically, a portion (hereinafter referred to as a "coil end") protruding beyond a slot in a direction along the output shaft of the motor.

In recent years, we use an increasing number of motors in vehicles and industrial equipment, for example. There is thus a demand for further downsizing of the motors.

In the background art disclosed in Patent Document 1, the wiring members at the coil ends increase the height of the stator in the direction along the output shaft, hindering sufficient downsizing of the motor.

The present invention was made in view of the problems. It is an objective of the present invention to downsize a motor including wiring members at coil ends.

Solution to the Problem

To achieve the objective, a motor according to the present invention includes at least: a stator; and a rotor at a predetermined distance from the stator. The stator includes at least: an annular yoke; a plurality of teeth connected to an inner circumference of the yoke; and a plurality of coils each wound around an associated one of the teeth. Each of the coils has coil ends at both ends in an axial direction in which an output shaft of the motor extends. At least one of the coil ends has, in an end surface thereof in the axial direction, at least one first recess extending along a radius of the stator, and a first wiring member that connects two or more of the coils and is housed in the first recess.

With this configuration, the stator has a reduced height in the axial direction, which leads to downsizing of the motor.

A coil according to the present invention is wound around a tooth in a stator of a motor. The coil includes: coil ends at both ends along an output shaft of the motor. At least one of the coil ends has, in an end surface thereof in an axial direction, at least one first recess extending along a radius of the stator.

With this configuration, the first recess houses the wiring member, which resulting in that the stator has thus a reduced height in the axis direction.

Advantages of the Invention

The motor according to the present invention includes a stator with a reduced height, which leads to downsizing of the motor. In the coil according to the present invention, a first recess houses a wiring member and the stator has thus a reduced height.

DESCRIPTION OF EMBODIMENTS

Embodiments of the present invention will be described in detail with reference to the drawings. The following description of advantageous embodiments is mere examples in nature, and is not at all intended to limit the scope, applications or use of the present invention.

First Embodiment

[Configuration of Motor]

Figure 1:
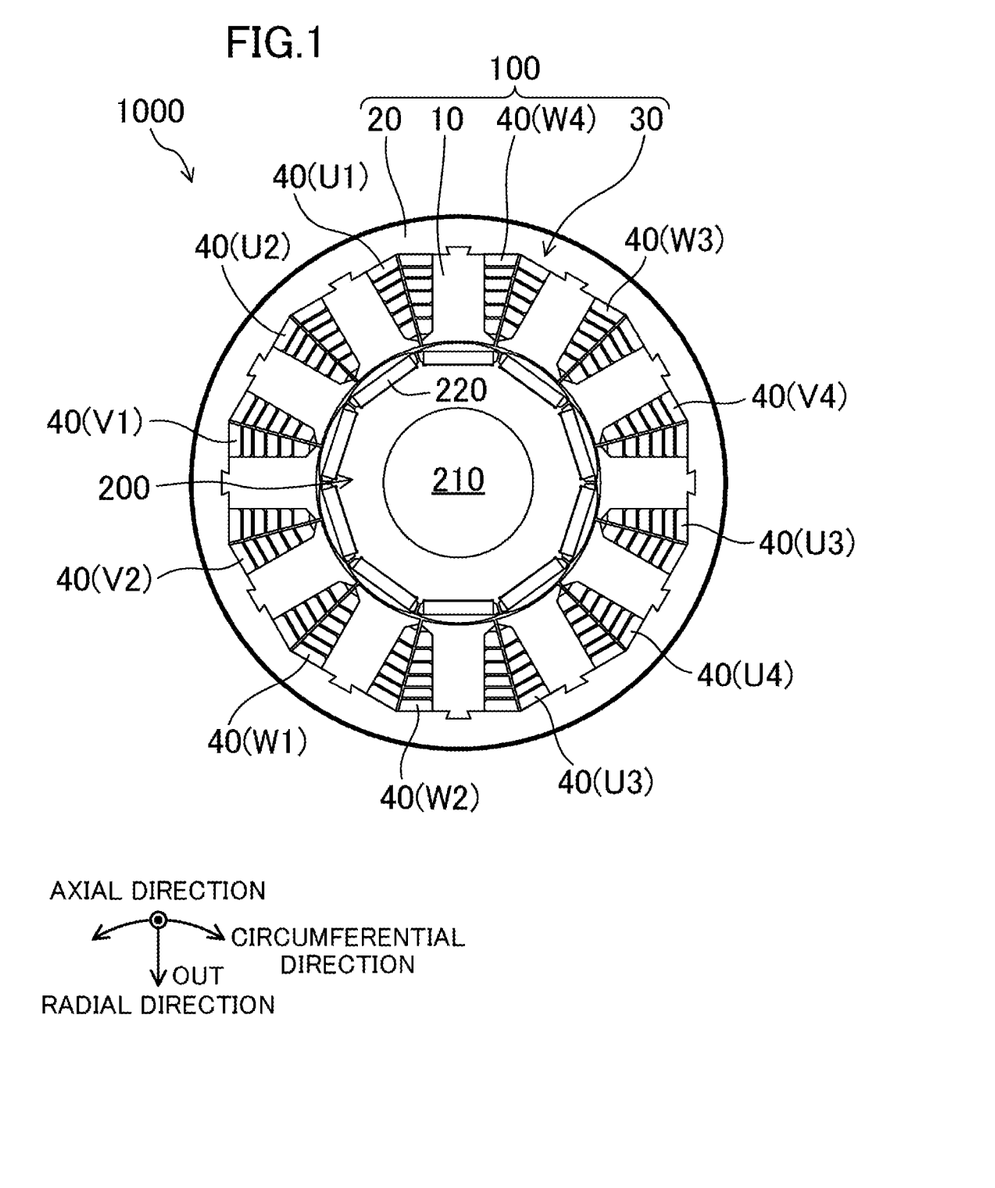
FIG. 1 is a cross-sectional view of a motor according to a first embodiment of the present invention.

FIG. 1 is a cross-sectional view of a motor according to this embodiment. In the following description, the directions along the radius and circumference of a motor 1000 may be referred to as a "radial direction" and a "circumferential direction", respectively. The direction (i.e., the direction perpendicular to the drawing plane of FIG. 1) in which an output shaft 210 of the motor 1000 extends may be referred to as an "axial direction". In the radial direction, the region around the center of the motor 1000 may be referred to as a "radially inner side", whereas the circumferential region of the motor may be referred to as a "radially outer side".

The motor 1000 includes a stator 100 and a rotor 200. While the motor 1000 also includes other components such as a motor case and bearings for pivotally supporting the output shaft, illustration and description thereof will be omitted for the sake of simplicity.

The stator 100 includes an annular yoke 20, teeth 10, slots 30, and coils 40. The teeth 10 are connected to the inner circumference of the yoke 20 and arranged at an equal interval along the inner circumference. Each slot 30 is located between a pair of the teeth 10 adjacent to each other in the circumferential direction. Each coil 40 is housed in one of the slots 30. The stator 100 is disposed on the radially outer side of the rotor 200 at a certain distance from the rotor 200.

Electromagnetic steel sheets containing silicon, for example, are stacked and punched into the teeth 10 and the yoke 20. Each coil 40 is a component obtained by winding a conductive wire having a quadrangular cross section and made of copper, for example, in n turns, where n is an integer of 2 or more. The coil 40 is wound around one of the teeth 10 with an insulator (not shown) interposed therebetween and is housed in one of the slots 30. The conductive wire constituting the coil 40 has, on its surface, an insulating film (not shown). In this embodiment, the coils 40 may be referred to as coils U1 to U4, V1 to V4, and W1 to W4 in accordance with the phase of the current flowing through the coils 40. In addition, each coil 40 includes, on its top viewed in the axial direction, a first wiring member 50 (see FIG. 2B) or a second wiring member 60 (see FIG. 7B) for electrically connecting two or more of the coils U1 to U4, V1 to V4, and W1 to W4.

The rotor 200 includes the output shaft 210 at the axial center and magnets 220. The magnets 220 face the stator 100 with N- and S-poles alternating along the circumference of the output shaft 210. The material, shape, and characteristics of the magnets 220 may be changed as appropriate in accordance with the output of the motor 1000, for example.

The coils U1 to U4, V1 to V4, and W1 to W4 are connected in series. The current of three phases, i.e., U, V, and W phases with a phase difference in an electrical angle of 120° is supplied to the coils U1 to U4, V1 to V4, and W1 to W4 and excited. Accordingly, a rotating magnetic field occurs in the stator 100. The interaction between this rotating magnetic field and the magnetic field generated by the magnets 220 in the rotor 200 generates torque so that the output shaft 210 is supported by bearings (not shown) and rotate.

[Configuration of Coil]

Figure 2A:
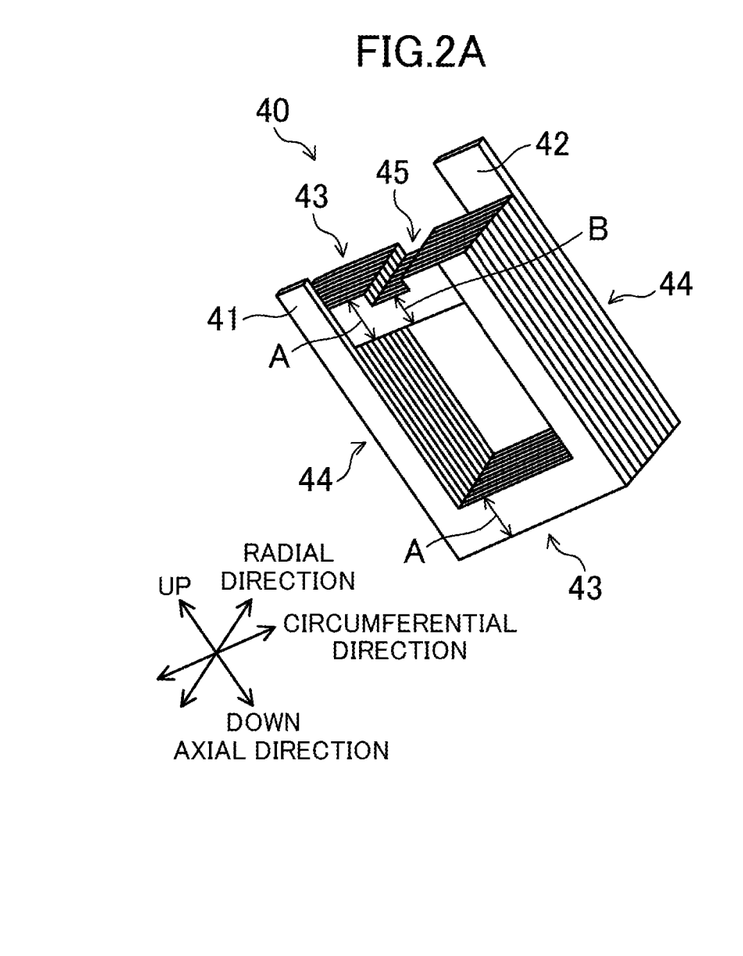
FIG. 2A is a perspective view of a coil according to the first embodiment with no first wiring member.
Figure 2B:
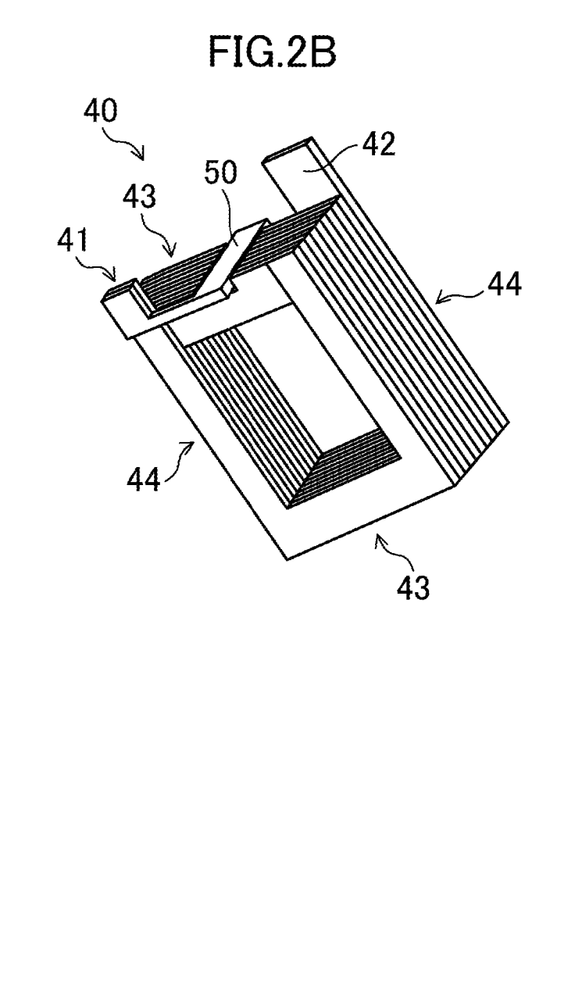
FIG. 2B is a perspective view of a coil according to the first embodiment with the first wiring member.

FIG. 2A shows perspective views of each coil according to this embodiment with no first wiring member, whereas FIG. 2B shows a perspective view of the coil with a first wiring member.

As shown in FIGS. 2A and 2B, the coil 40 has a first end 41, a second end 42, coil ends 43, and axially extending portions 44. When the coil 40 is wound around one of the teeth 10, the coil ends 43 extend along the end surfaces of the tooth 10 in the axial direction and the axially extending portions 44 extend along the end surfaces of the tooth 10 in the circumferential direction. The axially extending portion 44 is housed in the associated one of the slots 30 and contributes to generation of the rotating magnetic field passing through the stator 100.

One of the coil end 43 has a first recess 45 extending in the radial direction. As shown in FIG. 2B, the first wiring member 50 is housed in the first recess 45 and joined to the first end 41. Accordingly, the coil 40 and the first wiring member 50 are electrically connected together. The first wiring member 50 is a conductor with a quadrangular cross section. Note that the second end 42 is connected to another wiring member (not shown).

Among the turns of each coil 40, the coil ends 43 have substantially the same height A in the axial direction and the substantially flush end surfaces in the axial direction, except for the first recess 45. The term "substantially" meant in the present specification includes the manufacturing tolerance of the constituent members and the assembly tolerance of the components. For example, the expression "substantially equal" does not mean that values to be compared are equal in a strict sense.

Note that the height A refers to the distance from an end surface of the tooth 10 in the axial direction to an end surface of the coil end 43 in the axial direction, when the coil 40 is wound around the tooth 10. The height B, which is the distance from the end surface of the tooth 10 in the axial direction to the bottom of the first recess 45, is determined as appropriate in accordance with the resistance allowable by the coil 40. In other words, the height B is determined as appropriate in accordance with the allowable amount of heat generated when a predetermined current flows through the coil 40. Actually, since the coil 40 is wound around the tooth 10 with an insulator (not shown) interposed therebetween, the surface of the insulator serves the reference surface of the heights A and B.

Note that the thickness of the first wiring member 50, in other words, the height of the first wiring member 50 in the axial direction is substantially equal to the depth of the first recess 45. The scales are not particularly limited thereto. For example, the thickness of the first wiring member 50 may be greater than the depths of the first recess 45.

Advantages, Etc

As described above, the motor 1000 according to this embodiment includes at least the stator 100 and the rotor 200 at a predetermined distance from the stator 100. The stator 100 includes at least the annular yoke 20, the teeth 10 connected to the inner circumference of the yoke 20, and the coils 40 each wound around one of the teeth 10.

The coil 40 has the coil ends 43 at the both ends in the axial direction in which the output shaft 210 of the motor 1000 extends. One of the coil ends 43 has, in its end surface in the axial direction, the first recess 45 extending along the radius of the stator 100. The first recess 45 houses the first wiring member 50 that connects two or more of the coils 40.

According to this embodiment, one of the coil ends 43 has the first recess 45 extending in the radial direction and housing the first wiring member 50 therein. With this configuration, the stator 100 has a reduced height in the axial direction as compared to the background art with no first recess 45 as disclosed in Patent Document 1, for example. This configuration allows for downsizing of the motor 1000. In particular, if wiring members are stacked in the axial direction at one of the coil ends 43, the number of the stacked wiring members can be reduced substantially by one.

In the turns of each coil 40, the coil ends 43 have substantially the same height A in the axial direction and the substantially flush end surfaces in the axial direction. Therefore, the depth of the first recess 45 can be easily made uniform throughout the radius direction. This configuration allows for housing of the first wiring member 50 in the first recess 45 while the first wiring member lifts from the bottom of the first recess 45, which reduces the height of the coil 40 including the first wiring member 50, making it possible to downsize the motor 1000.

Each coil 40 according to this embodiment is wound around one of the teeth 10 in the stator 100 of the motor 1000, and has the coil ends 43 at the both ends in the axial direction, that is, in which the output shaft 210 of the motor 1000 extends. One of the coil ends 43 has, in its end surface in the axial direction, the first recess 45 extending along the radial direction of the stator 100.

The coils 40 with this configuration may house the first wiring members 50 in the first recesses 45. Accordingly, the stator 100 has a reduced height in the axial direction, which leads to downsizing of the motor 1000.

First Variation

Figure 3:
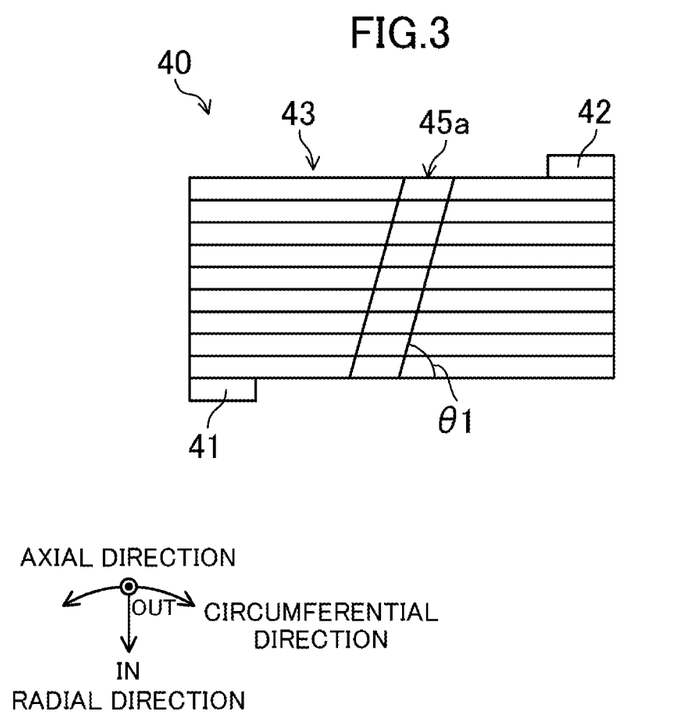
FIG. 3 is a top view of a coil according to a first variation.

FIG. 3 is a top view of a coil according to this variation. In FIG. 3, the same reference characters as those in the first embodiment are used to represent equivalent elements, and the detailed explanation thereof will be omitted.

In the configuration according to this variation, the direction of extension of each first recess 45*a* is different from that in FIGS. 2A and 2B. Specifically, the first recess 45*a* shown in this variation is located in the end surface of one coil end 43 in the axial direction and, in a top view, inclined at a predetermined angle θ1 with respect to the circumferential direction.

The first recesses 45*a* arranged in this manner make it possible to enhance the arrangement flexibility of the first wiring members 50. In addition, this variation is capable of providing the same or similar advantages as the first embodiment.

Second Variation

Figure 4A:
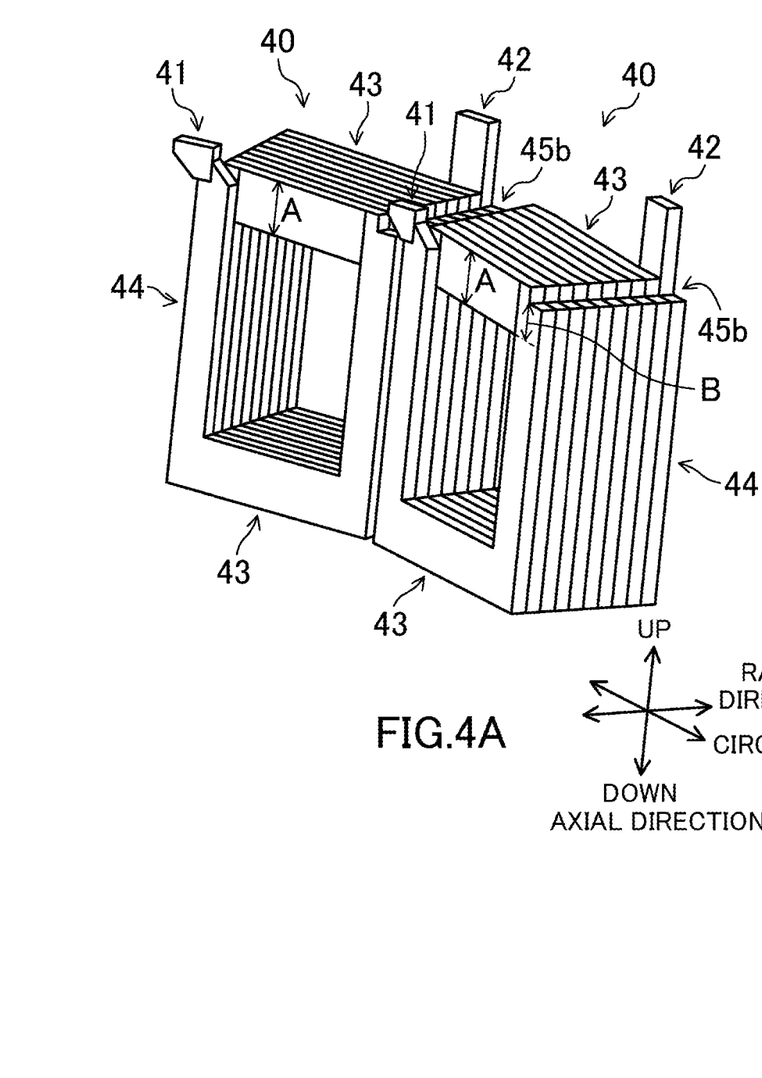
FIG. 4A is a perspective view of a coil according to a second variation with no first wiring member.
Figure 4B:
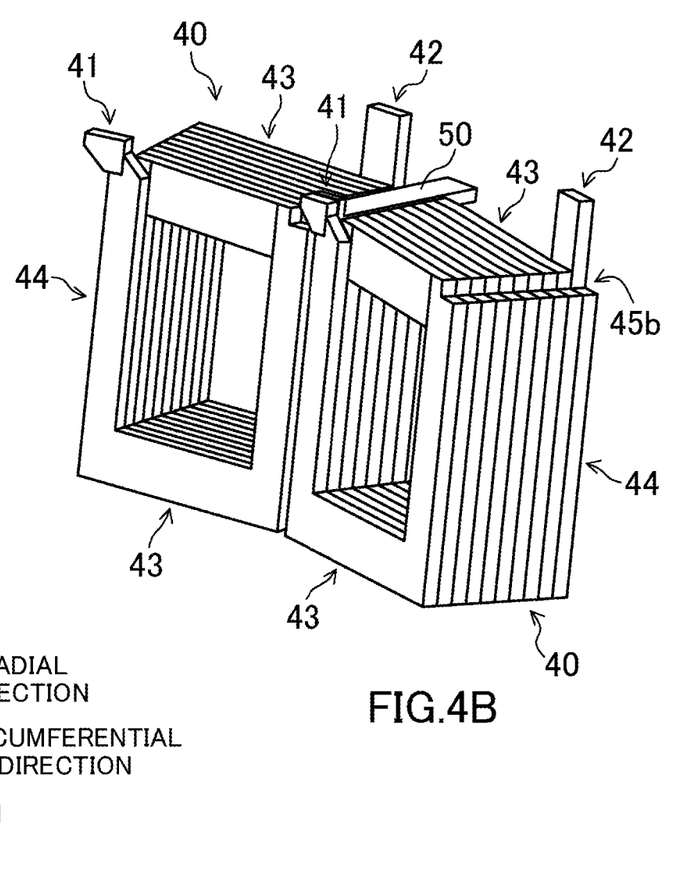
FIG. 4B is a perspective view of a coil according to a second variation with the first wiring members.

FIG. 4A shows perspective views of a coil according to this variation with no first wiring member, whereas FIG. 4B shows a perspective view of the coil with first wiring members. In FIGS. 4A and 4B, the same reference characters as those in the first embodiment are used to represent equivalent elements, and the detailed explanation thereof will be omitted.

In the configuration shown in the first embodiment, each first recess 45 is located at the center of the associated one of the coil ends 43 in the circumferential direction. On the other hand, in the configuration according to this variation, first recesses 45*b* are obtained by cutting out, in the radial direction, the facing corners of the coil ends 43 of a pair of the coils 40 adjacent to each other in the circumferential direction.

The first recesses 45*b* arranged in this manner make it possible to enhance the arrangement flexibility of the first wiring members 50. In addition, this variation provides the same or similar advantages as the first embodiment. In the configuration shown in FIG. 2B, the first wiring member 50 has the complicated shape because of the connection with the first end 41 of the coil 40. This variation allows for simplification of the shape of the first wiring member 50 and reduction in the number of the processing steps and costs.

The corners of the coil ends 43 have a larger cross-sectional area than the other portions. Therefore, even being cut out, the corners do not have a current density extremely higher than the other portions. This configuration allows for reduction in local heat generation at the corners of the coil ends 43 and enhancement of the reliability of the coil 40 and the efficiency of the motor 1000.

While the first recesses 45*b* are obtained by cutting out the facing corners of the coil ends 43 in this variation, only one of the corners may be cut out into the first recess 45*b*.

Second Embodiment

Figure 5A:
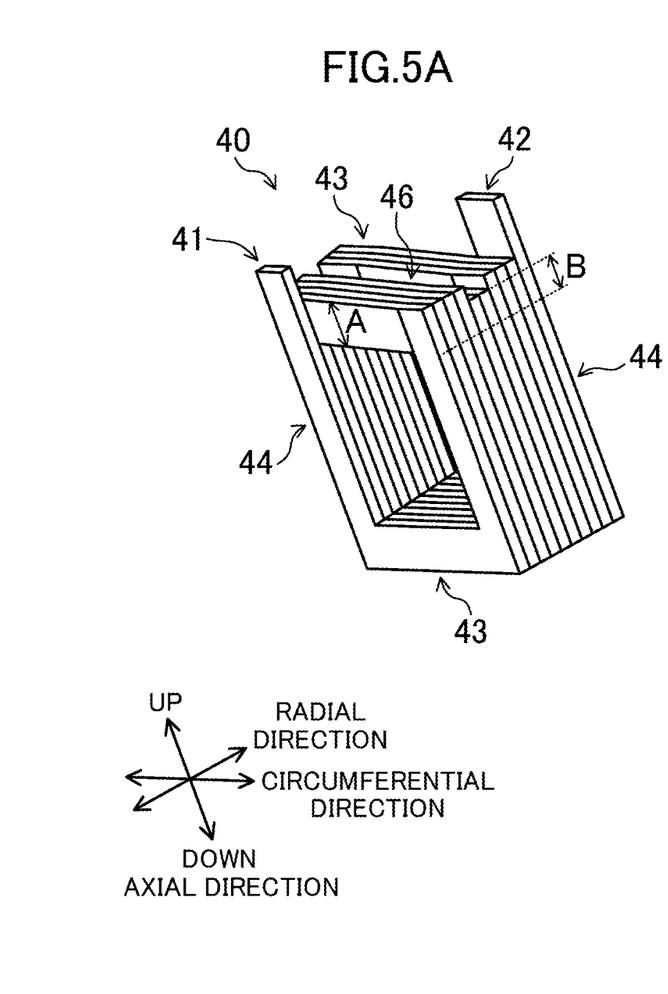
FIG. 5A is a perspective view of a coil according to a second embodiment of the present invention with no second wiring member.
Figure 5B:
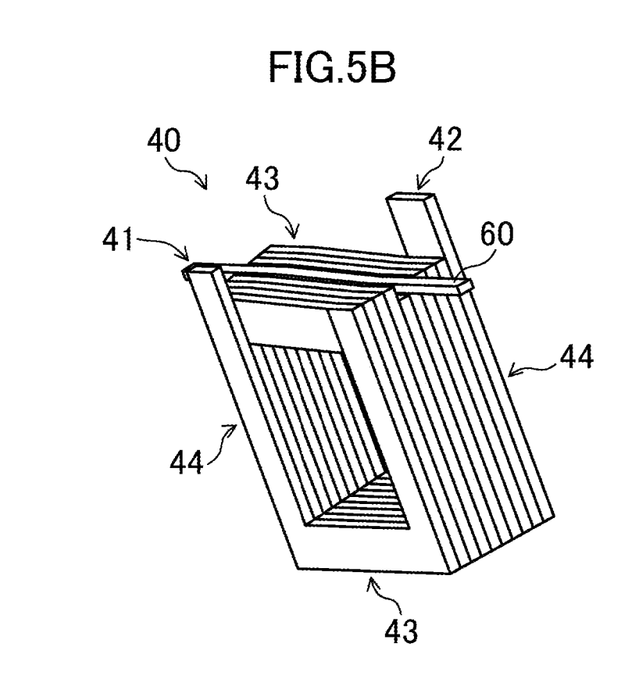
FIG. 5B is a perspective view of a coil according to a second embodiment of the present invention with the second wiring member.

FIG. 5A shows perspective views of a coil according to this embodiment with no second wiring member, whereas FIG. 5B shows a perspective view of the coil with a second wiring member. In FIGS. 5A and 5B, the same reference characters as those in the first embodiment are used to represent equivalent elements, and the detailed explanation thereof will be omitted.

In the configuration shown in the first embodiment, each first recess 45 extends in the radial direction in the end surface of the associated one of the coil ends 43 in the axial direction. On the other hand, in the configuration according to this embodiment, each second recess 46 extends in the circumferential direction in the end surface of the associated one of the coil ends 43 in the axial direction. In this respect, this embodiment differs from the first embodiment. Specifically, each coil 40 has the coil ends 43 at the respective ends in the axial direction. One of the coil ends 43 has, in its end surface in the axial direction, the second recess 46 extending along the circumference of the stator 100. The second recess 46 houses a second wiring member 60 that connects two or more of the coils 40. Note that the second recess 46 is formed by cutting out the coil end 43 in the circumferential direction.

The second recesses 46 arranged in this manner make it possible to enhance the arrangement flexibility of the second wiring members 60. The second recess 46 facilitates electrical connection between the coils 40 spaced apart from each other in the circumferential direction. For example, the coils U1 to U4 are connected in series, and the coils V1 to V4 and the coils W1 to W4, which are connected in series, can be connected by using a smaller number of wiring members.

The coil ends 43 have the substantially flush end surfaces in the axial direction. This configuration allows for reduction in the height of each coil 40 including the second wiring member 60, which downsizes the motor 1000 like in the first embodiment

Third Variation

Figure 6:
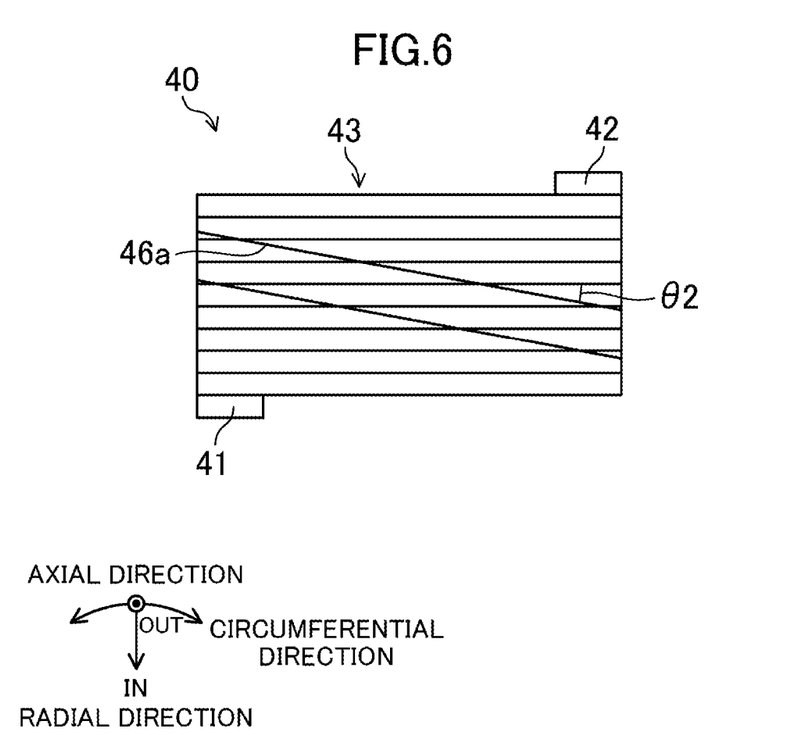
FIG. 6 is a top view of a coil according to a third variation.

FIG. 6 is a top view of a coil according to this variation. In FIG. 6, the same reference characters as those in the second embodiment are used to represent equivalent elements, and the detailed explanation thereof will be omitted.

In the configuration according to this variation, the direction of extension of each second recess 46*a* is different from that in FIGS. 5A and 5B. Specifically, the second recess 46*a* shown in this variation is located in the end surface of a coil end 43 in the axial direction and, in a top view, inclined at a predetermined angle θ2 with respect to the circumferential direction.

The second recesses 46*a* arranged in this manner make it possible to enhance the arrangement flexibility of the second wiring members 60. In addition, this variation provides the same or similar advantages as the second embodiment.

Third Embodiment

Figure 7A:
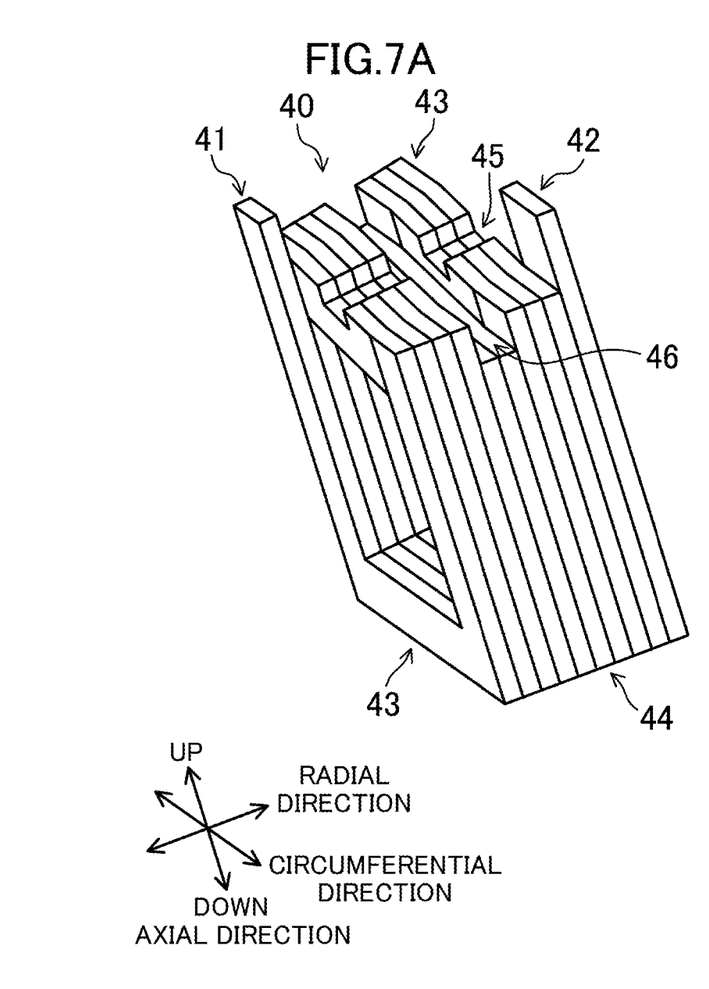
FIG. 7A is a perspective view of a coil according to a third embodiment of the present invention with neither first nor second wiring members.
Figure 7B:
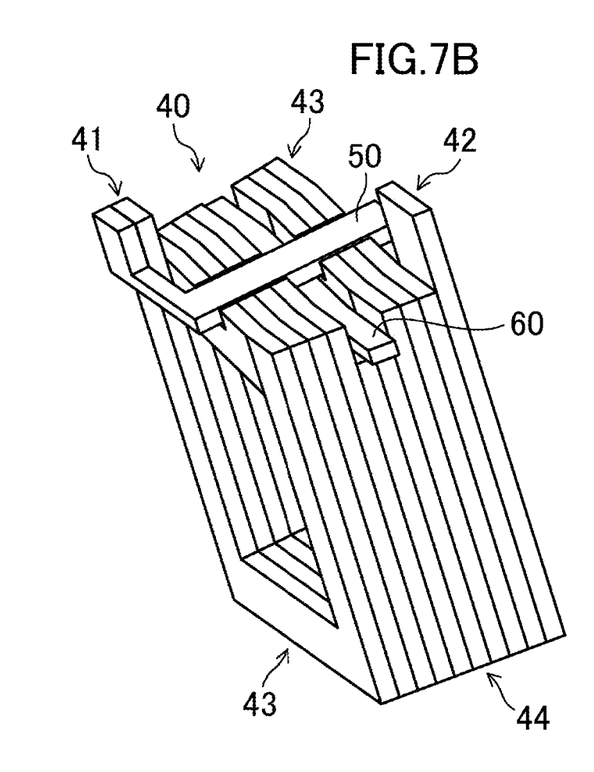
FIG. 7B is a perspective view of a coil according to a third embodiment of the present invention with the first and second wiring members.

FIG. 7A shows perspectives view of a coil according to this embodiment with neither first nor second wiring member, whereas FIG. 7B shows a perspective view of the coil with first and second wiring members. In FIGS. 7A and 7B, the same reference characters as those in the first and second embodiments are used to represent equivalent elements, and the detailed explanation thereof will be omitted.

In the configurations shown in the first and second embodiments, each first recess 45 extends in the radial direction in the end surface of the associated one of the coil ends 43 in the axial direction, and each second recess 46 extends in the circumferential direction in the end surface of the associated one of the coil ends 43 in the axial direction, respectively. On the other hand, in the configuration according to this embodiment, each of first and second recesses 45 and 46 extends in the radial and circumferential directions, respectively, in the end surface of the associated one of the coil ends 43 in the axial direction. In this respect, this embodiment differs from the first and second embodiment. The additional differences are as follows. A first wiring member 50 housed in the first recess 45 intersects a second wiring member 60 housed in the second recess 46. The first and second wiring members 50 and 60 are electrically isolated from each other. For the isolation, each of the first and second wiring members 50 and 60 has, on its surface, an insulating film (not shown). Like the first wiring members 50, the second wiring members 60 are conductors with a quadrangular cross section.

According to this embodiment, one of the coil ends 43 has, in its end surface in the axial direction, the first and second recesses 45 and 46. This configuration allows for enhancement of the arrangement flexibilities of the first and second wiring members 50 and 60 extending in different directions. In particular, each of the first and second wiring members 50 and 60 has, on its surface, the insulating film that electrically isolates the members from each other. This isolation allows the intersection between the first and second wiring members 50 and 60. That is, the isolation further enhances the arrangement flexibilities of the first and second wiring members 50 and 60.

In addition, this embodiment provides the same or similar advantages as the first and second embodiments.

Fourth Variation

Figure 8A:
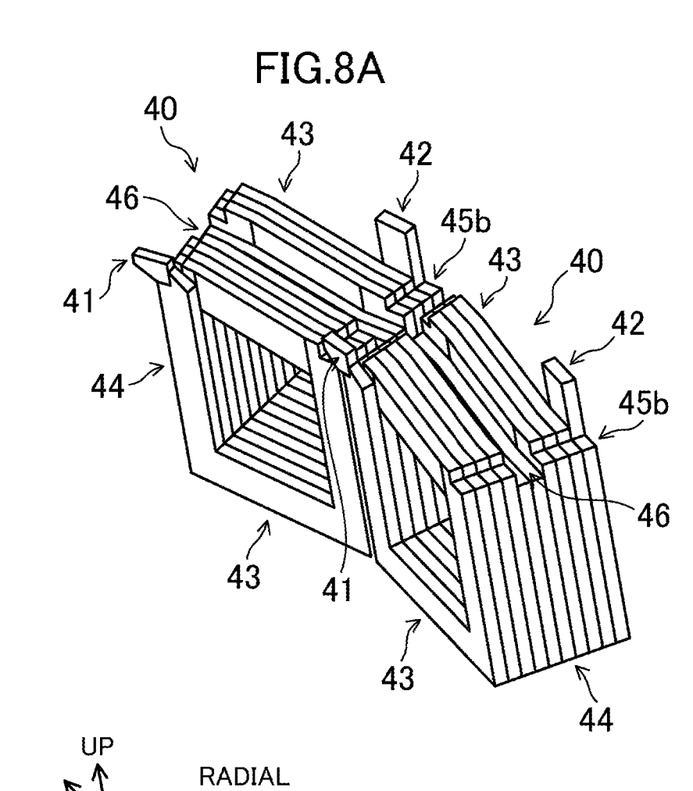
FIG. 8A is a perspective view of a coil according to a fourth variation with neither first nor second wiring members.
Figure 8B:
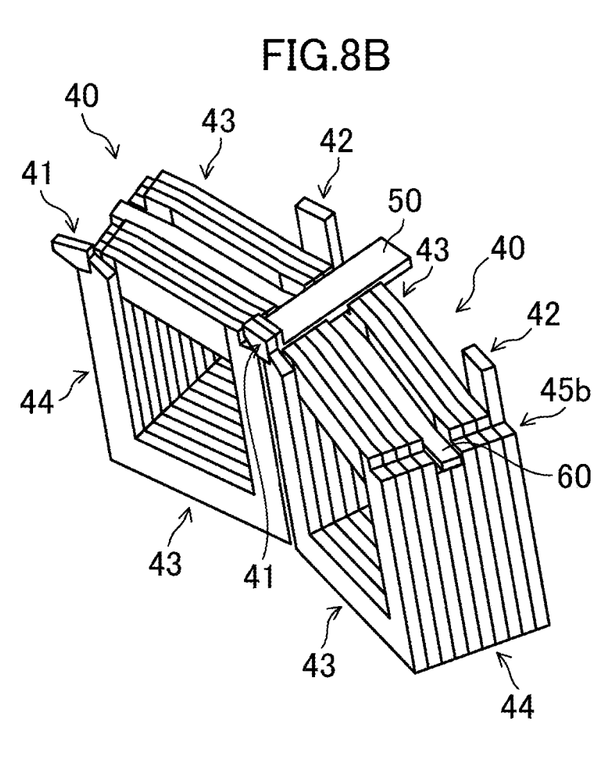
FIG. 8B is a perspective view of a coil according to a fourth variation with the first and the second wiring members.

FIG. 8A shows perspective views of a coil according to this variation with neither first nor second wiring member, whereas FIG. 8B shows a perspective view of the coil with first and second wiring members. In FIGS. 8A and 8B, the same reference characters as those in the third embodiment are used to represent equivalent elements, and the detailed explanation thereof will be omitted.

In the configuration shown in the third embodiment, each first recess 45 is located at the center of the associated one of the coil ends 43 in the circumferential direction. On the other hand, in the configuration according to this variation, first recesses 45b are obtained by cutting out, in the radial direction, the facing corners of the coil ends 43 of a pair of the coils 40 adjacent to each other in the circumferential direction.

The first recesses 45b formed in this manner make it possible to enhance the arrangement flexibility of the first wiring members 50. In addition, this variation provides the same or similar advantages as the third embodiment and the second variation.

As in the second variation, only one of the facing corners of the coil ends 43 may be cut out into the first recess 45b.

Other Embodiments

Each coil 40 may have a plurality of first recesses 45, 45a, and 45b. Each coil 40 may have a plurality of second recesses 46 and 46a. Alternatively, each coil 40 may have only a first recess 45, 45a, or 45b or only a second recess 46 or 46a. Each coil 40 may have one or more of first recesses 45, 45a, and 45b and one or more of second recesses 46 and 46a.

In the first to third embodiments, an example has been described where each coil 40 has the first or second recess 45 or 46 at only the upper coil end 43 in the axial direction. Alternatively, the first or second recess 45 or 46 may be located at the lower coil end 43 in the axial direction. In this case, the first or second wiring member 50 or 60 is housed in the first or second recess 45 or 46 at the lower coil end 43 in the axial direction. In this case, the first or second recess 45 or 46 may be located at each of the upper and lower coil ends 43 in the axial direction. Alternatively, the first or second wiring member 50 or 60 is housed in the first or second recess 45 or 46 at either the upper or lower coil ends 43 in the axial direction.

Each first wiring member 50 may have a portion housed in the first recess 45 and extending in the radial direction, and a portion housed in the second recess 46 and extending in the circumferential direction.

The first wiring members 50 arranged in this manner may serve as neutral lines of the motor 1000. In addition, the coils 40 each including a plurality of wiring members have a reduced height in the axial direction. Accordingly, it is possible to downsize the motor 1000.

Similarly, each second wiring member 60 may have a portion housed in the second recess 46 and extending in the circumferential direction, and a portion housed in the first recess 45 and extending in the radial direction.

In the configurations shown in FIGS. 7B and 8B, each of the first and second wiring members 50 and 60 has, on its surface, an insulating film. Instead, an insulating spacer (not shown) may be provided at the intersection between the first and second wiring members 50 and 60 to establish electrical isolation of the first and second wiring members 50 and 60 from each other.

Among the turns, the coil ends 43 may have different heights A in the axial direction. In this case as well, in order to ensure the density of the current flowing through each coil 40 and the reliability of the coil 40, the height B from an end surface of the tooth 10 to the bottom of the first recess 45 is equal to or greater than a predetermined value in each turn.

An example has been described in the first embodiment where the teeth 10 are connected to the annular yoke 20. The configuration is not particularly limited thereto. Each of the teeth 10 may be connected to one of divided yokes divided in the circumferential direction. In this state, the divided yokes may be connected together in the circumferential direction into the stator 100.

Each coil 40 may have a trapezoidal, rectangular, or square cross section. Alternatively, each coil may be an n-polygon, where n is an integer of 4 or more. The cross-sectional shapes of the first and second wiring members 50 and 60 are not particularly limited to the quadrangles, and may be n-polygons, circulars, or ellipses. In addition, the shapes of the first and second recesses 45 and 46 may be changed in accordance with the cross-sectional shapes of the first and second wiring members 50 and 60, respectively. Accordingly, the first or second wiring member 50 or 60 housed in the first or second recess 45 or 46 can be stably placed in each coil 40.

INDUSTRIAL APPLICABILITY

The motor according to the present invention includes housings for wiring members at coil ends to be downsized. The motor is thus useful as a motor that can be placed in a limited space in various types of electric devices or vehicles, for example.

DESCRIPTION OF REFERENCE CHARACTERS

10 Teeth
20 Yoke
30 Slot
40 Coil
43 Coil End
44 Axially Extending Portion
45, 45a, 45b First Recess
46, 46a Second Recess
50 First Wiring Member
60 Second Wiring Member
100 Stator
200 Rotor
210 Output Shaft
220 Magnet
1000 Motor

The invention claimed is:

1. A coil wound around a tooth in a stator of a motor, the coil comprising:
    coil ends at both ends along an output shaft of the motor, and
    at least one of the coil ends having, in an end surface thereof in an axial direction, at least one first recess extending along a radius of the stator, wherein
    referring to the end surface of the axial direction of the teeth,
    the axial height of the first recess is reduced compared with the other portions of the coil end, and
    in the turns of each coil, the coil ends have substantially the same height in the axial direction thereof,
    wherein
    the first recess is obtained by cutting out a corner of at least one of the coil ends.

2. The coil of claim 1, wherein
    at least one of the coil ends has, in the end surface thereof in the axial direction, at least one second recess extending in the circumferential direction of the stator,
    referring to the end surface of the axial direction of the teeth,
    the axial height of the second recess is reduced compared with the other portions of the coil end.

3. The coil of claim 2, wherein
    in a top view, the second recess is inclined at a predetermined angle with respect to the circumferential direction of the stator.

4. The coil of claim 1, wherein
    the first recess comprises a plurality of first recesses obtained by cutting out facing corners of the coil ends of a pair of the coils adjacent to each other in the circumferential direction of the stator.

5. The coil according to claim 1, wherein
    the first recess extends from an inner end of the coil in a radial direction of the stator to an outer end of the coil in the radial direction of the stator.

6. A motor comprising at least: a stator; and a rotor at a predetermined distance from the stator,
    the stator including at least: an annular yoke; a plurality of teeth connected to an inner circumference of the yoke; and a plurality of coils each wound around an associated one of the teeth,
    each of the coils having coil ends at both ends thereof in an axial direction in which an output shaft of the motor extends, and
    at least one of the coil ends having, in an end surface thereof in the axial direction, at least one first recess extending along a radius of the stator, and a first wiring member that connects two or more of the coils and is housed in the first recess,
    wherein
    referring to the end surface of the axial direction of the teeth,
    the axial height of the first recess is reduced compared with other portions of the coil end, and
    in the turns of each coil, the coil ends have substantially the same height in the axial direction thereof,
    wherein
    the first recess extends from an inner end, in a radial direction of the stator, of the coil which has the first recess, to an outer end, in the radial direction of the stator, of the coil.

7. A coil wound around a tooth in a stator of a motor, the coil comprising:
    coil ends at both ends along an output shaft of the motor, and
    at least one of the coil ends having, in an end surface thereof in an axial direction, at least one first recess extending along a radius of the stator, wherein
    referring to the end surface of the axial direction of the teeth,
    the axial height of the first recess is reduced compared with the other portions of the coil end, and
    in the turns of each coil, the coil ends have substantially the same height in the axial direction thereof,
    wherein
    the first recess extends from an inner end of the coil in a radial direction of the stator to an outer end of the coil in the radial direction of the stator.

* * * * *